(12) United States Patent
Han et al.

(10) Patent No.: US 9,588,609 B2
(45) Date of Patent: Mar. 7, 2017

(54) MOBILE TERMINAL AND METHOD OF CONTROLLING THE OPERATION OF THE MOBILE TERMINAL

(71) Applicant: LG ELECTRONICS INC., Seoul (KR)

(72) Inventors: Jaewon Han, Seoul (KR); Nilton Trevizan, Seoul (KR); Minkyu Ha, Seoul (KR); Kyungwook Hu, Seoul (KR); Wontaek Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/552,178

(22) Filed: Nov. 24, 2014

(65) Prior Publication Data

US 2015/0077377 A1   Mar. 19, 2015

Related U.S. Application Data

(63) Continuation of application No. 12/841,069, filed on Jul. 21, 2010, now abandoned.

(30) Foreign Application Priority Data

Jul. 21, 2009 (KR) .................. 10-2009-0066503
Oct. 19, 2009 (KR) .................. 10-2009-0099394

(51) Int. Cl.
*G06F 3/041* (2006.01)
*G06F 1/16* (2006.01)
(Continued)

(52) U.S. Cl.
CPC ............ *G06F 3/041* (2013.01); *G06F 1/1694* (2013.01); *G06F 3/0488* (2013.01); *H04M 1/67* (2013.01);
(Continued)

(58) Field of Classification Search
CPC .... H04M 2250/22; H04M 1/67; H04M 1/677; H04M 1/72544; G06F 3/041; G06F 3/0488; G06F 1/1694
See application file for complete search history.

(56) References Cited

U.S. PATENT DOCUMENTS

2007/0150826 A1 * 6/2007 Anzures .................. G06F 3/017
715/772
2007/0236330 A1 * 10/2007 Cho ....................... G06F 21/305
340/5.54
(Continued)

FOREIGN PATENT DOCUMENTS

JP 2007-304988 11/2007
KR 10-2008-0085983 9/2008
KR 10-2009-0065766 6/2009

OTHER PUBLICATIONS

Korean Intellectual Property Office Application Serial No. 10-2009-0066503, Office Action dated May 18, 2015, 6 pages.
(Continued)

*Primary Examiner* — Dinh P Nguyen
(74) *Attorney, Agent, or Firm* — Lee, Hong, Degerman, Kang & Waimey

(57) ABSTRACT

A mobile terminal and a method of controlling the operation of the mobile terminal are provided. The method includes placing the mobile terminal in lock mode; if a multi-touch signal including first and second touch signals is detected from a display module, releasing the mobile terminal from the lock mode, the first and second touch signals being touch signals detected from first and second areas, respectively, on the display module; and entering an operating mode which is set to enter upon the touching of the second area. Therefore, it is possible to unlock the mobile terminal and then readily enter a predefined operating mode in response to a multi-touch input detected from certain areas on the display module.

14 Claims, 15 Drawing Sheets

(51) Int. Cl.
  *G06F 3/0488*  (2013.01)
  *H04M 1/67*  (2006.01)
  *H04M 1/677*  (2006.01)
  *H04M 1/725*  (2006.01)

(52) U.S. Cl.
  CPC ........ *H04M 1/677* (2013.01); *H04M 1/72544* (2013.01); *H04M 2250/22* (2013.01)

(56) References Cited

U.S. PATENT DOCUMENTS

| | | | |
|---|---|---|---|
| 2008/0220752 A1* | 9/2008 | Forstall | H04M 1/56 455/415 |
| 2009/0006991 A1* | 1/2009 | Lindberg | G06F 3/04817 715/763 |
| 2010/0042954 A1* | 2/2010 | Rosenblatt | G06F 1/1626 715/863 |
| 2010/0079380 A1* | 4/2010 | Nurmi | G06F 3/04883 345/172 |

OTHER PUBLICATIONS

Korean Intellectual Property Office Application Serial No. 10-2009-0099394, Office Action dated Aug. 31, 2015, 5 pages.

* cited by examiner

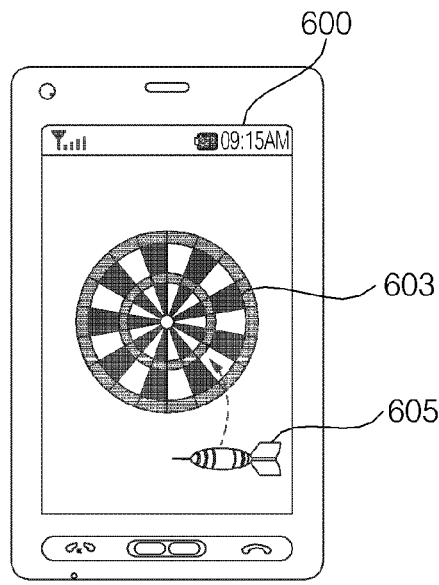 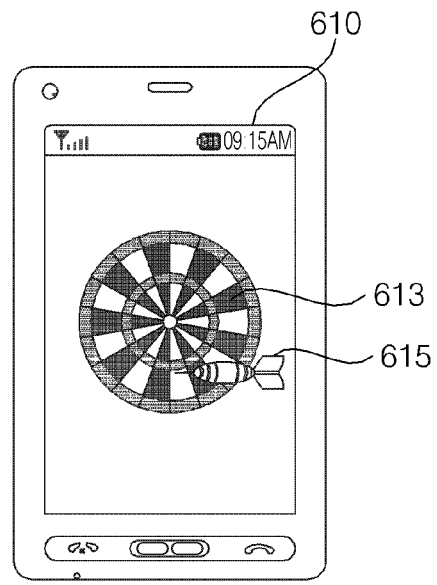
FIG. 14(a)  FIG. 14(b)
FIG. 15
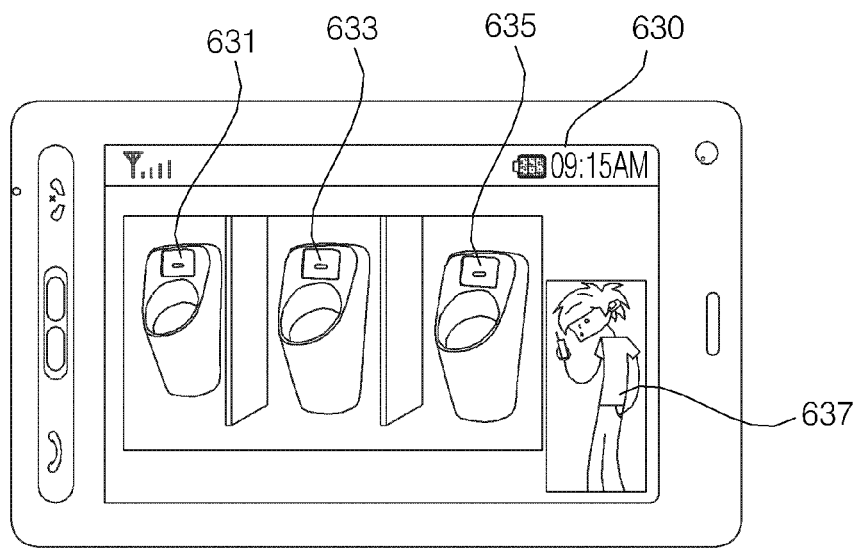

MOBILE TERMINAL AND METHOD OF CONTROLLING THE OPERATION OF THE MOBILE TERMINAL

CROSS-REFERENCE TO RELATED APPLICATIONS

This application is a continuation of U.S. application Ser. No. 12/841,069, filed on Jul. 21, 2010, abandoned, which claims the benefit of earlier filing date and right of priority to Korean Patent Application Nos. 10-2009-0066503, filed on Jul. 21, 2009, and 10-2009-0099394, filed on Oct. 19, 2009, the contents of which are all hereby incorporated by reference herein in their entirety.

BACKGROUND OF THE INVENTION

1. Field of the Invention

The present invention relates to a mobile terminal and a method of controlling the operation of the mobile terminal, in which the mobile terminal can be easily released from lock mode and then placed in a predefined operating mode simply by multi-touching a certain part of the mobile terminal.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

Mobile terminals equipped with touch screens can be placed in lock mode. When in the lock mode, the mobile terminals do not respond to any typical touch signal input thereto from the touch screens or any typical key signal input thereto from user input units. The mobile terminals can be released from the lock mode by touching their touch screens for more than a predefined amount of time or entering a password or a certain key signal.

However, in the case of using a touch or key-based lock/unlock feature, mobile terminals may be accidentally placed in or released from lock mode. On the other hand, in the case of using a password-based lock/unlock feature, mobile terminals may not be able to be quickly released from lock mode and enter a desired operating mode.

Therefore, it is necessary to develop ways to release a mobile terminal from lock mode and then readily enter any operating mode while preventing the mobile terminal from being accidentally unlocked.

SUMMARY OF THE INVENTION

The present invention provides a mobile terminal and a method of controlling the operation of the mobile terminal, in which the mobile terminal can be prevented from being accidentally unlocked and can be easily released from lock mode and placed in a predefined operating mode, if necessary.

According to an aspect of the present invention, there is provided a method of controlling the operation of a mobile terminal, the method including placing the mobile terminal in lock mode; if a multi-touch signal including first and second touch signals is detected from a display module, releasing the mobile terminal from the lock mode, the first and second touch signals being touch signals detected from first and second areas, respectively, on the display module; and entering an operating mode which is set to enter upon the touching of the second area.

According to another aspect of the present invention, there is provided a mobile terminal including a display module; and a controller, wherein, if a multi-touch signal including first and second touch signals detected from first and second areas, respectively, on the display module is received when the mobile terminal is placed in lock mode, the controller releases the mobile terminal from the lock mode and controls the mobile terminal to enter an operating mode which is set to enter upon the touching of the second region.

According to another aspect of the present invention, there is provided a method of controlling the operation of a mobile terminal, the method including placing the mobile terminal in lock mode; and if a touch signal is detected from a display module, and at the same time, a predefined movement of the mobile terminal is detected, releasing the mobile terminal from the lock mode and entering an operating mode which is set to enter upon the detection of the predefined movement of the mobile terminal.

According to another aspect of the present invention, there is provided a mobile terminal including a display module; a motion sensor configured to sense the movement of the mobile terminal and output a sensing signal as the result of the sensing; and a controller, wherein, if a touch signal is detected from a display module, and at the same time, a predefined movement of the mobile terminal is detected, the controller releases the mobile terminal from lock mode and controls the mobile terminal to enter an operating mode which is set to enter upon the detection of the predefined movement of the mobile terminal.

According to another aspect of the present invention, there is provided a method of controlling the operation of a mobile terminal, the method including placing the mobile terminal in lock mode; receiving a gesture input through a display module; and if the received gesture input has a predefined input order and shape, releasing the mobile terminal from the lock mode.

According to another aspect of the present invention, there is provided a mobile terminal including a display module; and a controller configured to receive a gesture input through the display module when the mobile terminal is placed in lock mode, wherein, if the received gesture input has a predefined input order and shape, the controller releases the mobile terminal from the lock mode.

According to another aspect of the present invention, there is provided a method of controlling the operation of a mobile terminal, the method including placing the mobile terminal in lock mode; displaying a plurality of slider bars on a display module and moving each of the sliders in the slider bars in accordance with a touch-and-drag input detected from the display module; and if a combination of the positions of the sliders in the slider bars matches with a predefined combination, releasing the mobile terminal from the lock mode.

According to another aspect of the present invention, there is provided a mobile terminal including a display module configured to display a plurality of slider bars when the mobile terminal is placed in lock mode; and a controller configured to move each of the sliders in the slider bars in accordance with a touch-and-drag input detected from the display module, wherein, if a combination of the positions of the sliders in the slider bars matches with a predefined combination, the controller releases the mobile terminal from the lock mode.

According to another aspect of the present invention, there is provided a method of controlling the operation of a mobile terminal, the method including displaying first and second icons on a display module; moving the first icon in accordance with a touch-and-drag input detected from the display module; and if the first icon is dragged and thus overlaps the second icon, performing an operation corresponding to the overlapping area of the first and second icons.

According to another aspect of the present invention, there is provided a mobile terminal including a display module configured to display first and second icons; and a controller configured to move the first icon in accordance with a touch-and-drag input detected from the display module, wherein, if the first icon is dragged and thus overlaps the second icon, the controller performs an operation corresponding to the overlapping area of the first and second icons.

BRIEF DESCRIPTION OF THE DRAWINGS

The above and other features and advantages of the present invention will become more apparent by describing in detail preferred embodiments thereof with reference to the attached drawings in which:

FIGS. 14(a), 14(b), 15, 16(a), 16(b), and 16(c) illustrate diagrams of screens for explaining the fifth exemplary embodiment.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
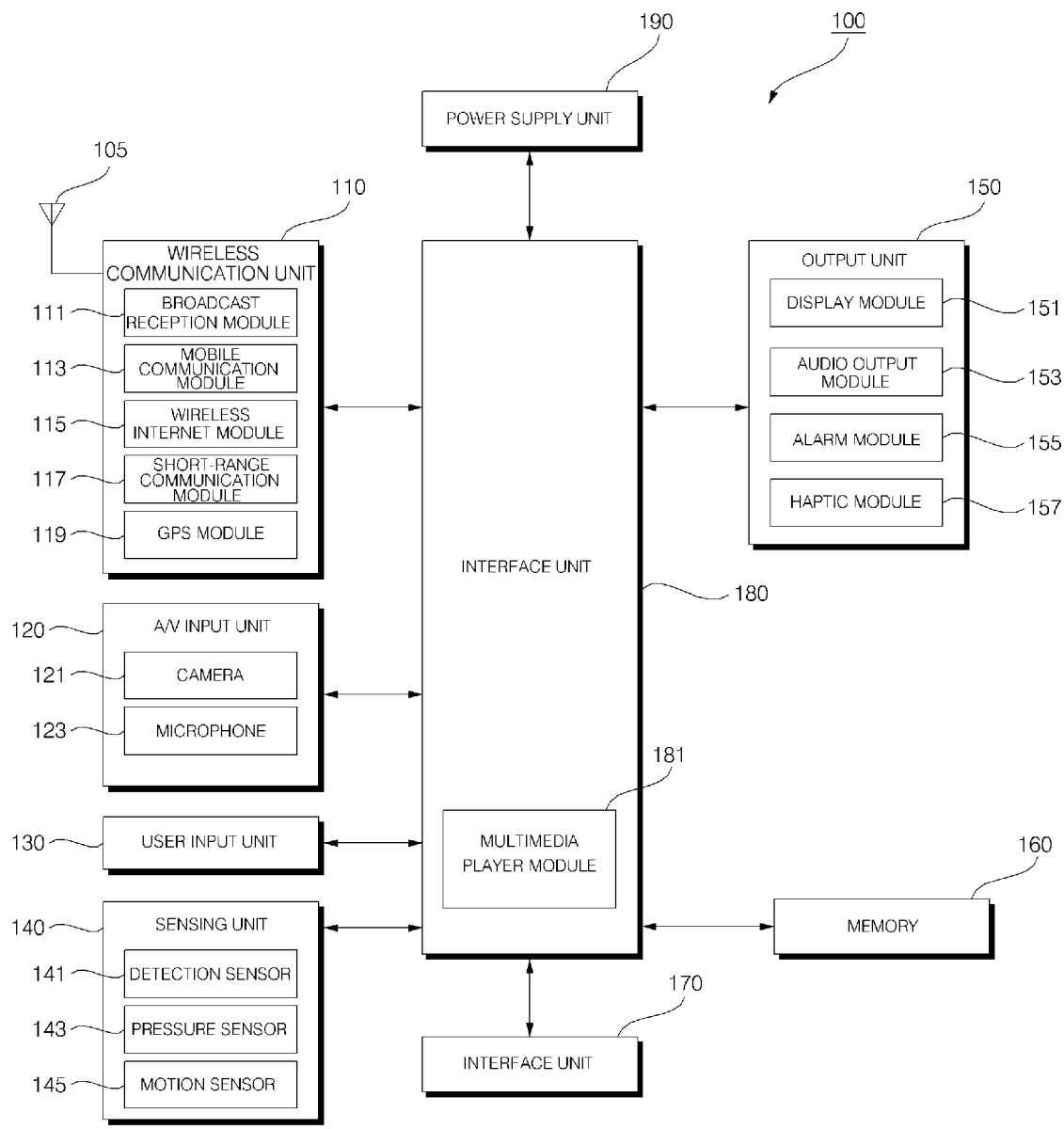
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the units of the mobile terminal 100 may be incorporated into a single unit, or some of the units of the mobile terminal 100 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms.

The broadcast reception module 111 may receive the broadcast signal using various broadcasting systems. In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station, and may output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slide mobile terminal, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may detect an approaching object without any mechanical contact. More specifically, the proximity sensor 141 may detect an approaching object by detecting a change in an alternating magnetic field or the rate of change of static capacitance. The sensing unit 140 may include two or more proximity sensors 141.

The pressure sensor 143 may determine whether pressure is being applied to the mobile terminal 100 and may detect the magnitude of pressure applied to the mobile terminal 100. The pressure sensor 143 may be installed in a portion of the mobile terminal 100 in which the detection of pressure is used. For example, the pressure sensor 143 may be installed in the display module 151. In this case, the display module 151 can differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

Further, acceleration sensors are a type of device for converting an acceleration vibration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing different axial directions may be incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel may keep monitoring whether the touch screen panel is being touched by the user. Once a touch input is received, the touch screen panel may transmit a number of signals corresponding to the touch input to the touch screen panel controller. The touch screen panel controller may process the signals transmitted by the touch screen panel, and may transmit the processed signals to the controller 180. Then, the controller 180 may determine whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181 playing multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other units of the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a bar-type mobile terminal equipped with a touch screen. However, the present invention is not restricted to a bar-type mobile terminal. Rather, the present invention can be applied to various mobile phones, other than a bar-type mobile terminal.

Figure 2:
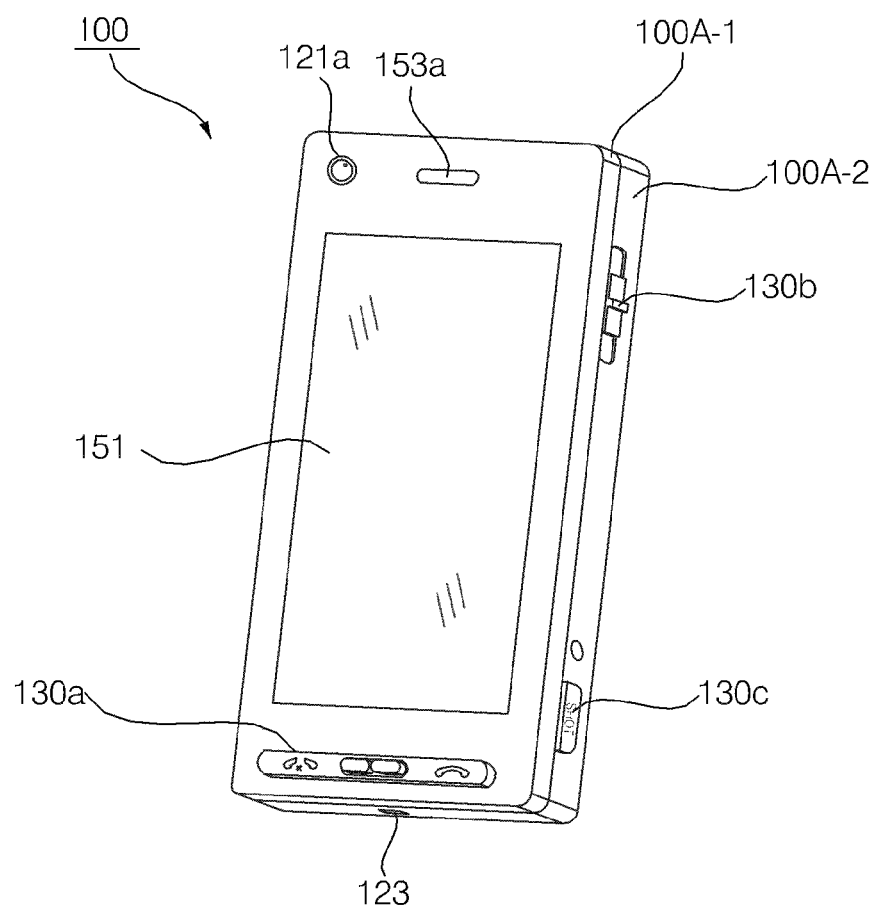
FIG. 2 illustrates a front perspective view of the mobile terminal shown in FIG. 1.

FIG. 2 illustrates a front perspective view of the mobile terminal 100 shown in FIG. 1. Referring to FIG. 2, the exterior of the mobile terminal 100 may be formed by a front case 100A-1 and a rear case 100A-2. Various electronic devices may be installed in the space formed by the front case 100A-1 and the rear case 100A-2. One or more intermediate cases (not shown) may be additionally provided between the front case 100A-1 and the rear case 100A-2. The front case 100A-1 and the rear case 100A-2 may be formed of a synthetic resin through injection molding. Alternatively, the front case 100A-1 and the rear case 100A-2 may be formed of a metallic material such as stainless steel (STS) or titanium (Ti).

The display module 151, a first audio output module 153a, a first camera 121a and a first user input module 130a may be disposed in the main body of the mobile terminal 100, and particularly, in the front case 100A-1. A second user input module 130b, a third user input module 130c and the microphone 123 may be disposed on one side of the rear case 100A-2.

Examples of the display module 151 include an LCD and an OLED which can visualize information. Since a touch pad is configured to overlap the display module 151 and thus to form a mutual layer structure, the display module 151 may serve as a touch screen and may thus be able to allow the user to enter various information simply by touching the display module 151.

The first audio output module 153a may be implemented as a receiver or speaker. The first camera 121a may be configured to be suitable for taking a self-photo or video. The microphone 123 may be configured to be suitable for capturing the voice of the user or other sounds.

The first through third user input modules 130a through 130c may be collectively referred to as the user input unit 130. The user input unit 130 may adopt various manipulation methods as long as it can offer tactile feedback to the user properly.

For example, the user input unit 130 may be implemented as a dome switch or a touch pad capable of receiving a command or information by being pushed or touched, or as a wheel, a jog shuttle or a joystick.

The first user input module 130a may allow the user to enter various commands such as 'start', 'end', and 'scroll' to the mobile terminal 100, the second user input module 130b may be used to select an operating mode for the mobile terminal 100, and the third user input module 130c may be used as a hot key for activating certain functions of the mobile terminal 100.

Figure 3:
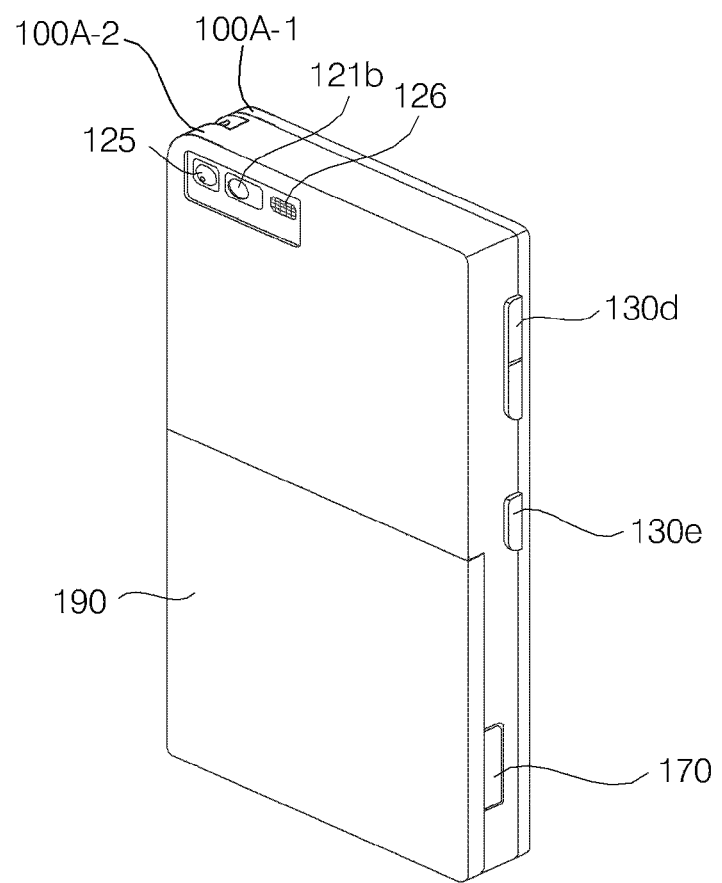
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fourth user input module 130d and a fifth user input module 130e and the interface unit 170 may be disposed on a lateral side of the rear case 100A-2, and a second camera 121b may be disposed at the back of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. Since images captured by the second camera 121b generally do not need to be transmitted, a high-resolution camera may be used as the second camera 121b.

A cameral flash 125 and a mirror 126 may be disposed near the second camera 121b. The cameral flash 125 may be used to illuminate a subject when the second camera 121b captures an image of the subject. The user may look in the mirror 126 and prepare himself or herself for taking a self-photo or video.

A second audio output module may be additionally provided in the rear case 100A-2, and may thus realize a stereo function along with the first audio output module 153a. The second audio output module may also be used during a speaker-phone mode.

An antenna (not shown) for receiving a broadcast signal may be disposed on one side of the rear case 100A-2. The antenna may be installed so as to be able to be refracted from the rear case 100A-2.

The power supply unit 190 may be disposed in the rear case 100A-2. The power supply unit may be a rechargeable battery and may be coupled to the rear case 100A-2 so as to be attachable to or detachable from the rear case 100A-2.

The second camera 121b, the fourth and fifth user input modules 130d and 130e, and the interface unit 170 are illustrated in FIG. 3 as being provided in the rear case 100A-2, but the present invention is not restricted to this. In addition, the first camera 121a may be configured to be rotatable and thus to cover the photographing direction of the second camera 121b. In this case, the second camera 121b may be optional.

Figure 4:
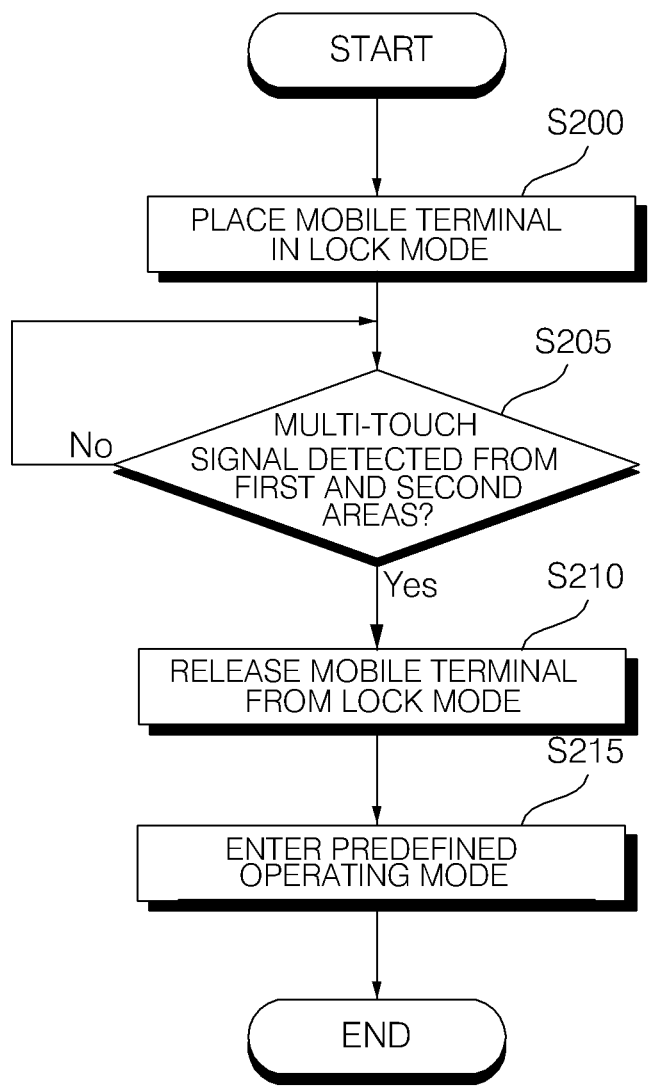
FIG. 4 illustrates a flowchart of a method of controlling the operation of a mobile terminal according to a first exemplary embodiment of the present invention.

FIG. 4 illustrates a flowchart of a method of controlling the operation of a mobile terminal according to a first exemplary embodiment of the present invention. Referring to FIG. 4, if a touch signal or a key signal is detected for more than a predefined amount of time or if a command to lock the mobile terminal 100 is received from the user, the controller 180 may place the mobile terminal 100 in protection or lock mode, during which the mobile terminal 100 does not respond to any typical touch or key input (S200).

When the mobile terminal 100 is placed in the lock mode, the mobile terminal 100 does not respond to a typical touch or key input. The mobile terminal 100 may be locked for all operating menus or only for a certain operating menu such as making a call, accessing the internet, or protecting privacy. If the mobile terminal 100 is placed in the lock mode, an icon may be displayed, or a sound effect or a haptic effect may be generated in order to alert the user.

Thereafter, the controller 180 may determine whether a multi-touch signal including first and second touch signals has been detected from the display module 151 (S205). The first touch signal is a touch signal detected from a first region on the display module 151 and the second touch signal is a touch signal detected from a second region on the display module 151.

The first and second regions may be arbitrarily set by the user. The first and second touch signals may be received either at the same time or one after another. In both cases alike, the controller 180 may determine that the multi-touch signal has been received.

Thereafter, if it is determined in S205 that the multi-touch signal has been received, the controller 180 may release the mobile terminal 100 from the lock mode (S210). In this case, the controller 180 may output an alarm signal such as a sound effect or a haptic effect in order to alert the user.

Thereafter, the controller 180 may control the mobile terminal 100 to enter a predefined operating mode set in advance to enter upon the touching of the second region (S215). The predefined operating mode may be selected in advance by the user. The user may set more than one second region on the display module 151, and may associate the second regions with different operating modes. In this case, the mobile terminal 100 can be placed in one of the different operating modes after being released from the lock mode according to which of the second regions has been touched by the user. For this, a menu for setting the first and second areas on the display module 151 or for setting an operating mode to be entered when the second area is touched may be provided.

In this manner, it is possible to release the mobile terminal 100 from the lock mode and readily enter a predefined operating mode in response to a multi-touch signal.

Figure 5:
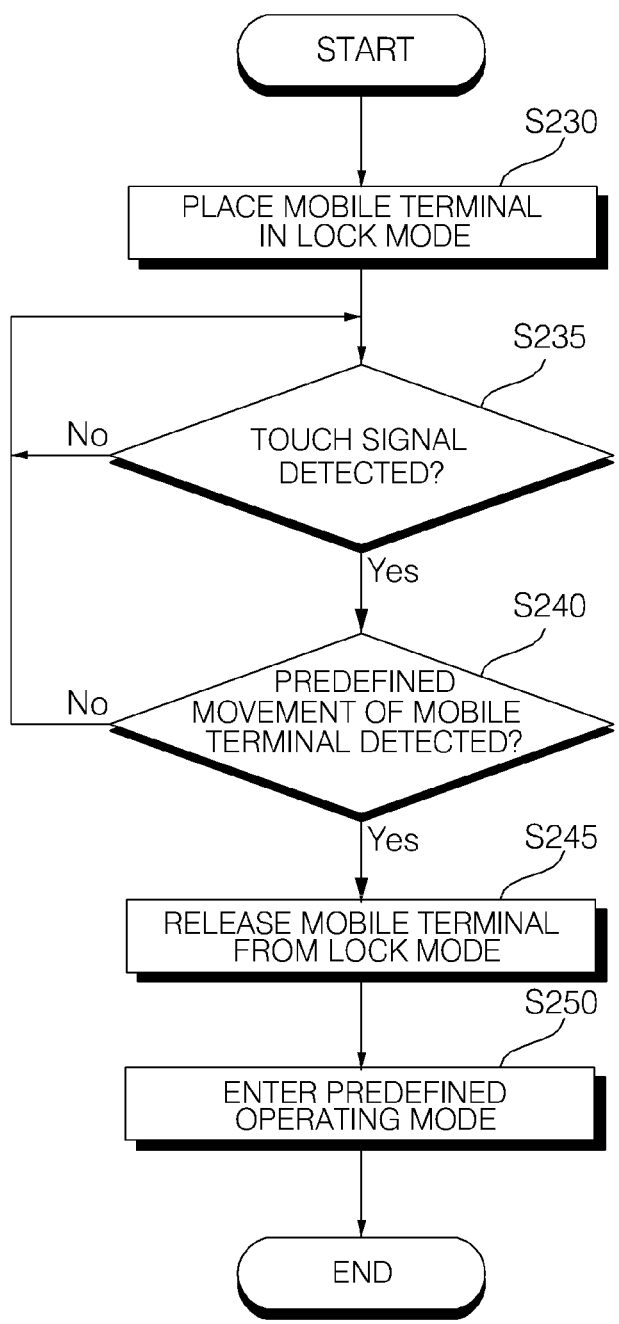
FIG. 5 illustrates a flowchart of a method of controlling the operation of a mobile terminal according to a second exemplary embodiment of the present invention.

FIG. 5 illustrates a flowchart of a method of controlling the operation of a mobile terminal according to a second exemplary embodiment of the present invention. Referring to FIG. 5, if a touch signal or a key signal is detected for more than a predefined amount of time or if a command to lock the mobile terminal 100 is received from the user, the controller 180 may place the mobile terminal 100 in protection or lock mode, during which the mobile terminal 100 does not respond to any typical touch or key input (S230).

Thereafter, the controller 180 may determine whether a touch signal has been detected from the display module 151 (S235) and whether a predefined movement of the mobile terminal 100 has also been detected (S240). One or more areas capable of receiving a touch signal may be set in advance on the display module 151 by the user.

The motion of the mobile terminal 100 may be detected based on a variation in a sensing signal output by the motion sensor 145. Examples of the predefined movement of the mobile terminal 100 include swinging the mobile terminal 100 back and forth or left and right, moving the mobile terminal 100 about a predetermined axis, rotating the mobile terminal 100 about a predetermined axis, and turning the mobile terminal 100 upside down.

Thereafter, if it is determined in S235 that a touch signal has been detected from the display module 151 and if it is determined in S240 that the predefined movement of the mobile terminal 100 has also been detected, the controller 180 may release the mobile terminal 100 from the lock mode (S245). In this case, the controller 180 may output an alarm signal such as a sound effect or a haptic effect in order to alert the user.

Thereafter, the controller 180 may control the mobile terminal 100 to enter a predefined operating mode set to enter upon the detection of the predefined movement of the mobile terminal 100 (S250). The predefined operating mode may be selected in advance by the user.

In this manner, it is possible to release the mobile terminal 100 from the lock mode and readily enter a predefined operating mode in response to a touch signal and the predefined movement of the mobile terminal 100.

Figure 6:
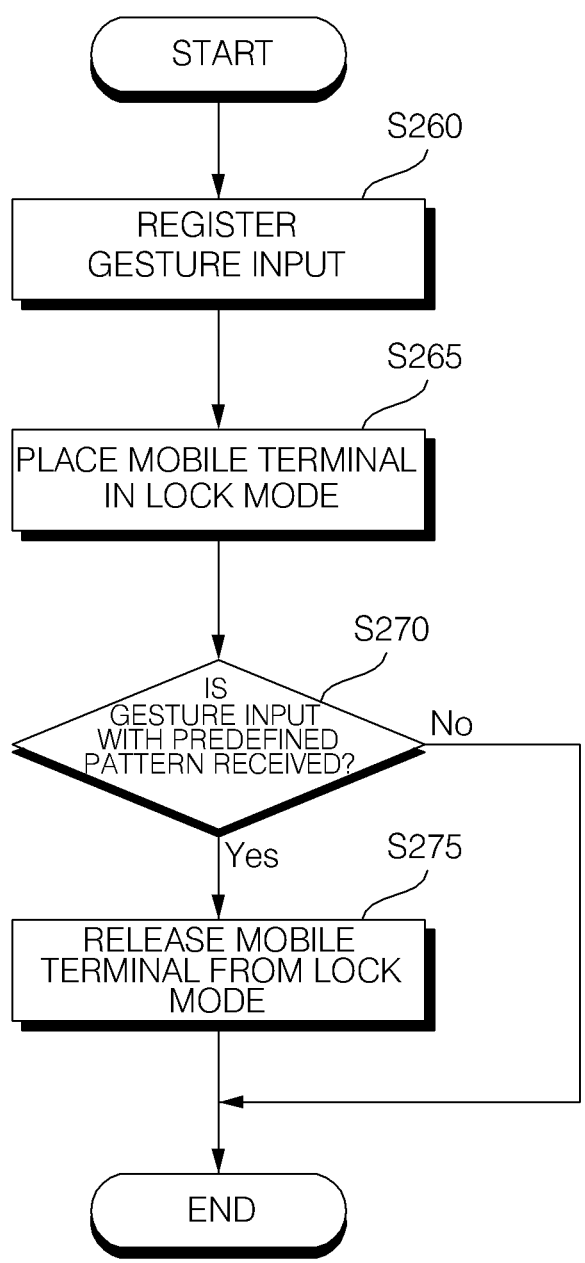
FIG. 6 illustrates a flowchart of a method of controlling the operation of a mobile terminal according to a third exemplary embodiment of the present invention.

FIG. 6 illustrates a flowchart of a method of controlling the operation of a mobile terminal according to a third exemplary embodiment of the present invention. Referring to FIG. 6, at least one gesture input for unlocking the mobile terminal 100 may be registered in accordance with a user command by using the display module 151 (S260). The term 'gesture,' as used herein, indicates a touch and drag with a uniform drag trajectory.

Thereafter, if a touch signal or a key signal is detected for more than a predefined amount of time or if a command to lock the mobile terminal 100 is received from the user, the controller 180 may place the mobile terminal 100 in protection mode or lock mode, during which the mobile terminal 100 does not respond to any typical touch or key input (S265).

Thereafter, the controller 180 may determine whether the same gesture input as that registered in S260 has been detected from the display module 151 (S270) by comparing the received gesture input with the gesture input registered in S260 in terms of the shape of each symbol or character represented by the received gesture input and the stroke order for each symbol or character represented by the received gesture input.

If it is determined in S270 that the same gesture input as that registered in S260 has been detected from the display module 151, the controller 180 may release the mobile terminal from the lock mode (S275). Otherwise, the controller 180 may not release the mobile terminal 100 from the lock mode.

In this manner, it is possible to easily release the mobile terminal from the lock mode in response to a predefined gesture input.

Figure 7:
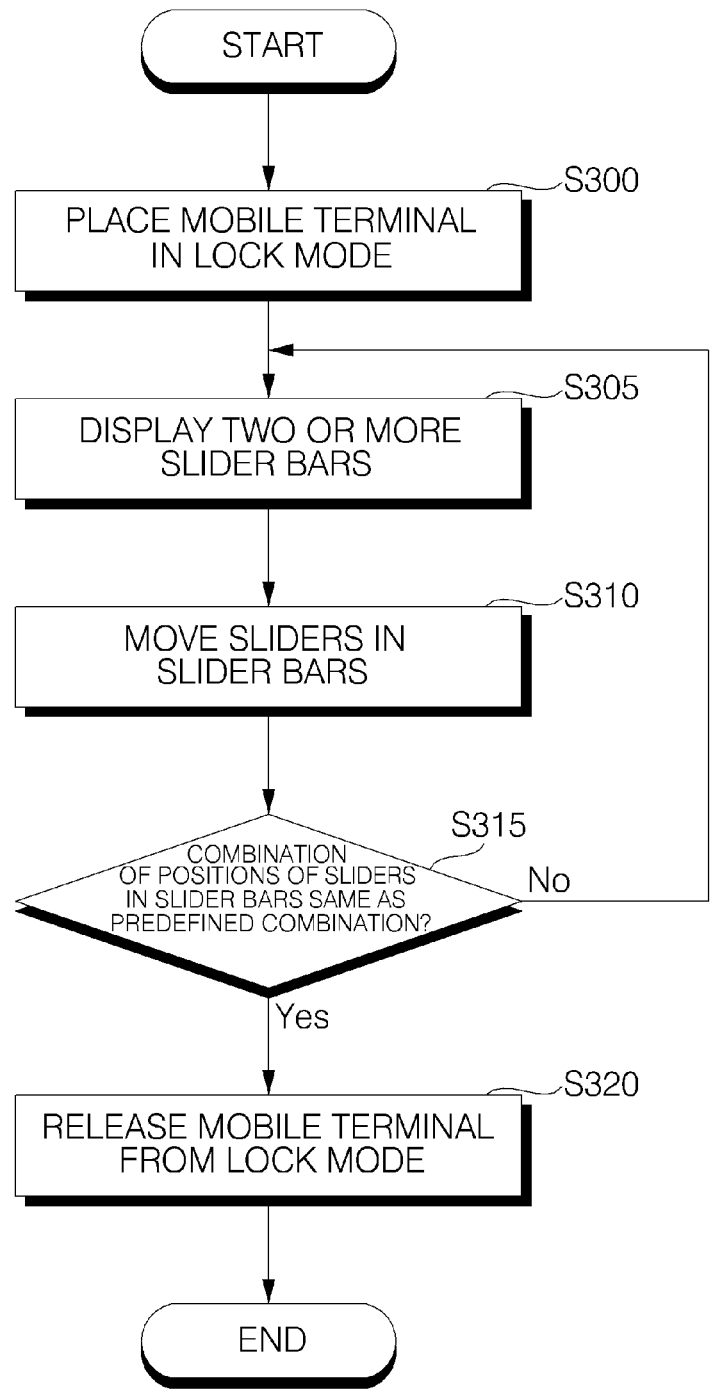
FIG. 7 illustrates a flowchart of a method of controlling the operation of a mobile terminal according to a fourth exemplary embodiment of the present invention.

FIG. 7 illustrates a flowchart of a method of controlling the operation of a mobile terminal according to a fourth exemplary embodiment of the present invention. Referring to FIG. 7, if a touch signal or a key signal is detected for more than a predefined amount of time or if a command to lock the mobile terminal 100 is received from the user, the controller 180 may place the mobile terminal 100 in protection mode or lock mode, during which the mobile terminal 100 does not respond to any typical touch or key input (S300).

Thereafter, the controller 180 may display two or more slider bars on the display module 151 (S305). The slider bars may be displayed on the display module 151 only when a touch signal is detected from the display module 151.

Thereafter, if each of the sliders in the slider bars is moved by being touched and dragged (S310), the controller 180 may determine whether the combination of the current positions of the sliders in the slider bars matches with a predefined combination (S315). The predefined combination may be set in advance by the user. For example, if three slider bars, i.e., first through third slider bars, are displayed on the display module 151, the mobile terminal 100 may be released from the lock mode when the slider in the first slider bar is dragged up a notch from the bottom, the slider in the second slider bar is dragged up three notches from the bottom, and the slider in the third slider bar is dragged up a notch from the bottom.

Thereafter, if it is determined in S315 that the combination of the current positions of the sliders in the slider bars matches with the predefined combination, the controller 180 may release the mobile terminal 100 from the lock mode (S320). Otherwise, the controller 180 may not release the mobile terminal 100 from the lock mode.

A signal for unlocking the mobile terminal 100 may be set by appropriately moving the sliders in the first through third slider bars, for example, by dragging up the slider in the first slider bar a notch from the bottom, dragging up the slider in the second slider bar two notches from the bottom, and dragging up the slider in the third slider bar a notch from the bottom.

In this manner, it is possible to unlock the mobile terminal 100 by appropriately moving the sliders in slider bars.

Figure 8:
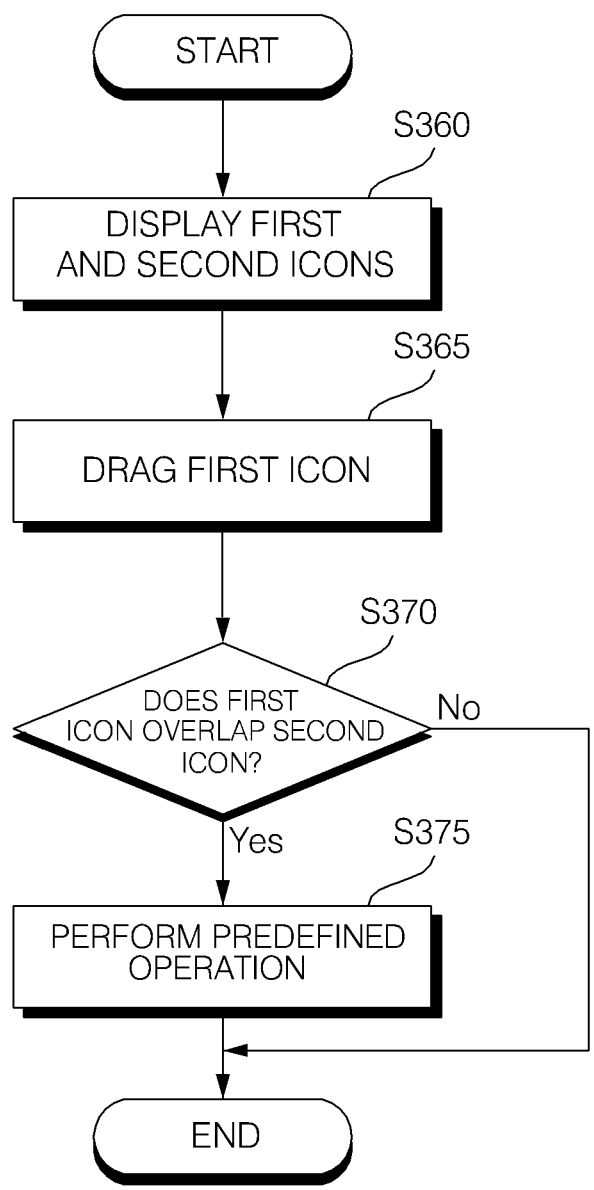
FIG. 8 illustrates a flowchart of a method of controlling the operation of a mobile terminal according to a fifth exemplary embodiment of the present invention.

FIG. 8 illustrates a flowchart of a method of controlling the operation of a mobile terminal according to a fifth exemplary embodiment of the present invention. Referring to FIG. 8, the controller 180 may display first and second icons on the display module 151 (S360). The first and second icons may have various shapes. For example, if the first icon is an image of a dart, the second icon may be an image of a dartboard. On the other hand, if the first icon is an image of a person, the second icon may be an image of a toilet stool. On the other hand, if the first icon is a thumbnail image, the second icon may be an image of a camera.

Thereafter, if the first icon is touched and dragged (S365), the controller 180 may determine whether the first icon overlaps the second icon (S370).

Thereafter, if it is determined in S370 that the first icon overlaps the second icon, the controller 180 may perform a predefined operation corresponding to the overlapping area of the first and second icons (S375). The predefined operation may be selected in advance by the user. Examples of the predefined operation include releasing the mobile terminal 100 from lock mode and playing a video or music file.

When the second icon is larger than the first icon, the controller 180 may perform different operations according to which part of the second icon is overlapped by the first icon. For example, if the first icon is an image of a dart, the second icon is an image of a dartboard divided into a number of sections and the first icon is dragged and thus overlaps one of the sections of the dartboard, the controller 180 may perform an operation corresponding to the dartboard section currently being overlapped by the first icon.

Figures 9A, 9B:
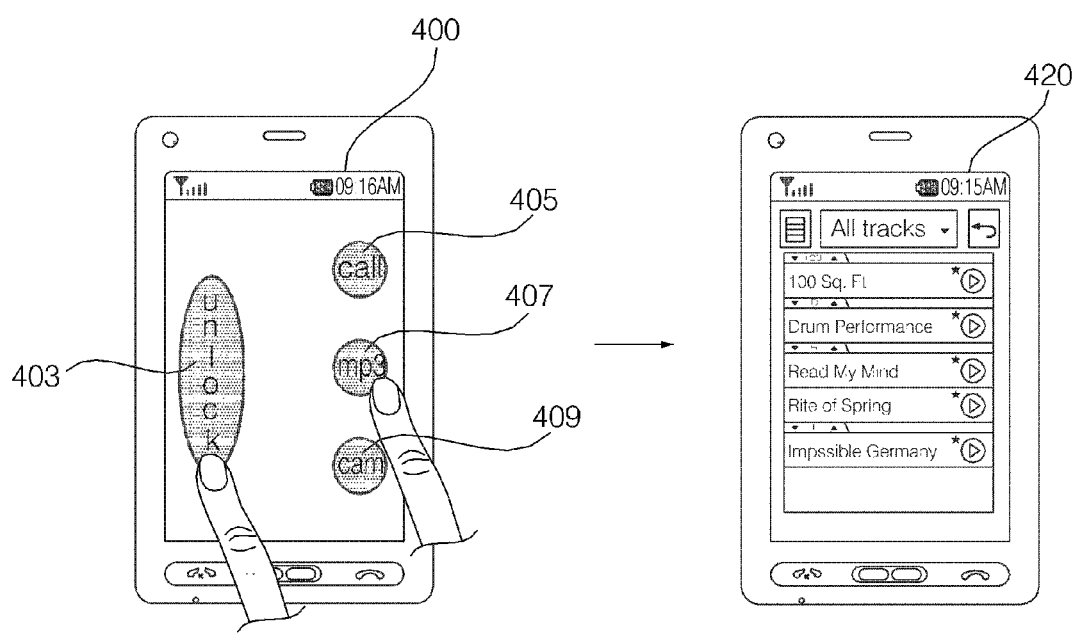
FIGS. 9(a) and 9(b) illustrate diagrams of screens for explaining the first exemplary embodiment.

FIGS. 9(a) and 9(b) illustrate diagrams of screens for explaining the first exemplary embodiment of the present invention. Referring to FIG. 9(a), a first area 403 for unlocking the mobile terminal 100 and a plurality of second areas 405, 407 and 409 for performing various functions such as making a call, playing a music file or capturing a video may be set on the display module 151. The first area 403 and the second areas 405, 407 and 409 may or may not appear on a screen 400.

If the first area 403 and one of the second areas 405, 407 and 409 are touched at the same time or one after another when the mobile terminal 100 is placed in lock mode, the mobile terminal 100 may be released from the lock mode and may then enter a predefined operating mode. For example, referring to FIG. 9(b), if the first area 403 and the second area 407 are touched, the mobile terminal 100 may be released from the lock mode and may then enter a music play mode, and an operating screen 420 corresponding to the music play mode may be displayed on the display module 151.

Figures 10A, 10B:
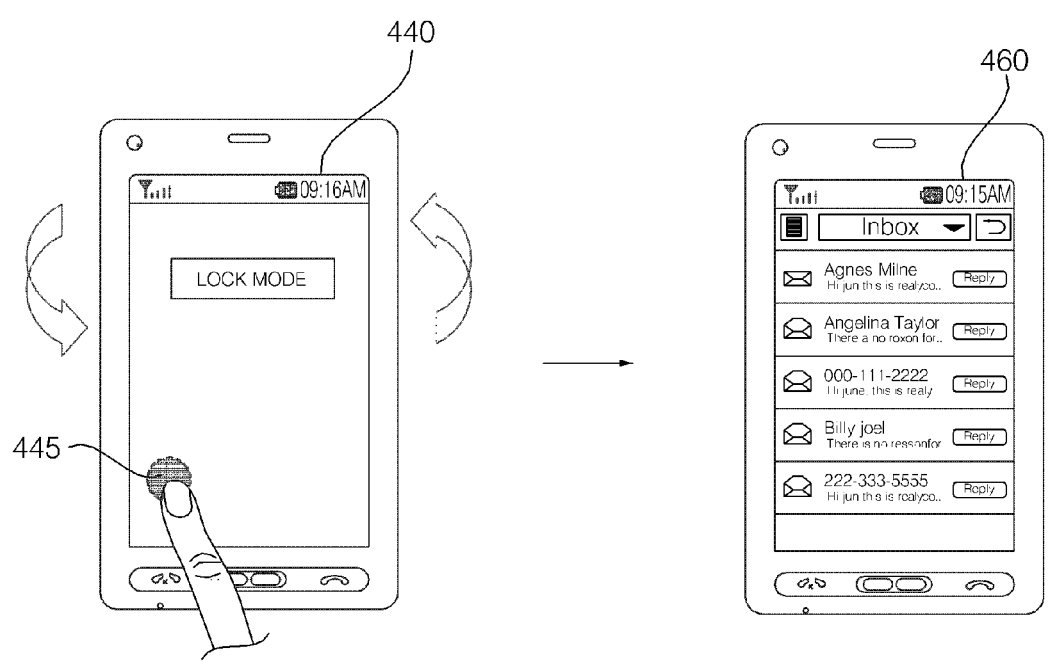
FIGS. 10(a), 10(b), 11(a), and 11(b) illustrate diagrams of screens for explaining the second exemplary embodiment.

FIGS. 10(a), 10(b), 11(a), and 11(b) illustrate diagrams of screens for explaining the second exemplary embodiment of the present invention. Referring to FIGS. 10(a) and 10(b), if the mobile terminal 100 is swung back and forth while touching the display module 151 with a finger, as indicated by reference numeral 445, the mobile terminal 100 may be unlocked and may then enter an email inbox mode, and thus, an operating screen 460 corresponding to the email inbox mode may be displayed on the display module 151.

Figure 11A:
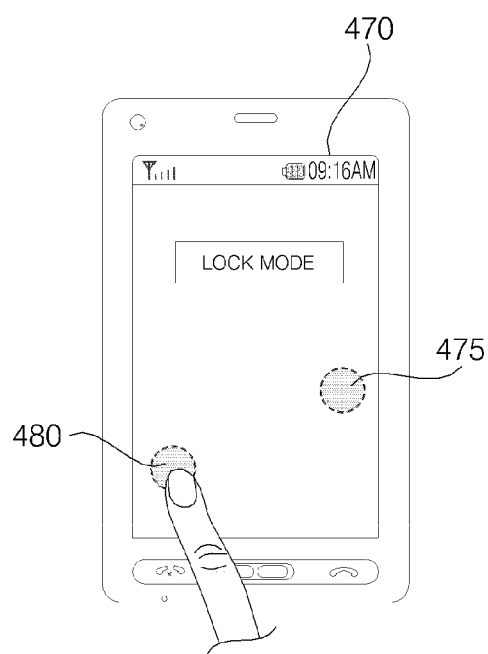
Figure 11B:
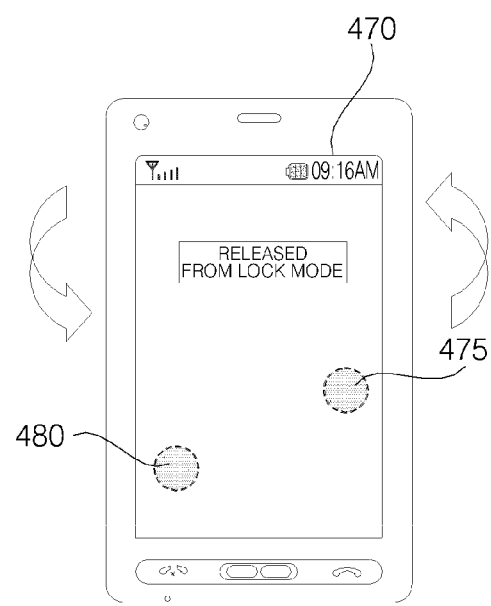

Referring to FIG. 11(a), even if first and second areas 475 and 480 on the display module 151 are touched at the same time or one after another when the mobile terminal 100 is placed in lock mode, the mobile terminal 100 may not be released from the lock mode. That is, the mobile terminal 100 may not be released from the lock mode simply in response to a multi-touch input. In this case, referring to FIG. 11(b), the mobile terminal 100 may be released from the lock mode by touching the first and second areas 475 and 480 and then swinging or shaking the mobile terminal 100 or by swinging or shaking the mobile terminal 100 while touching the first and second areas 475 and 480.

In short, it is possible to easily release the mobile terminal 100 from the lock mode and/or enter a predefined operating mode in response to the detection of a multi-touch input and a predefined movement of the mobile terminal 100.

Figures 12A, 12B, 12C, 12D:
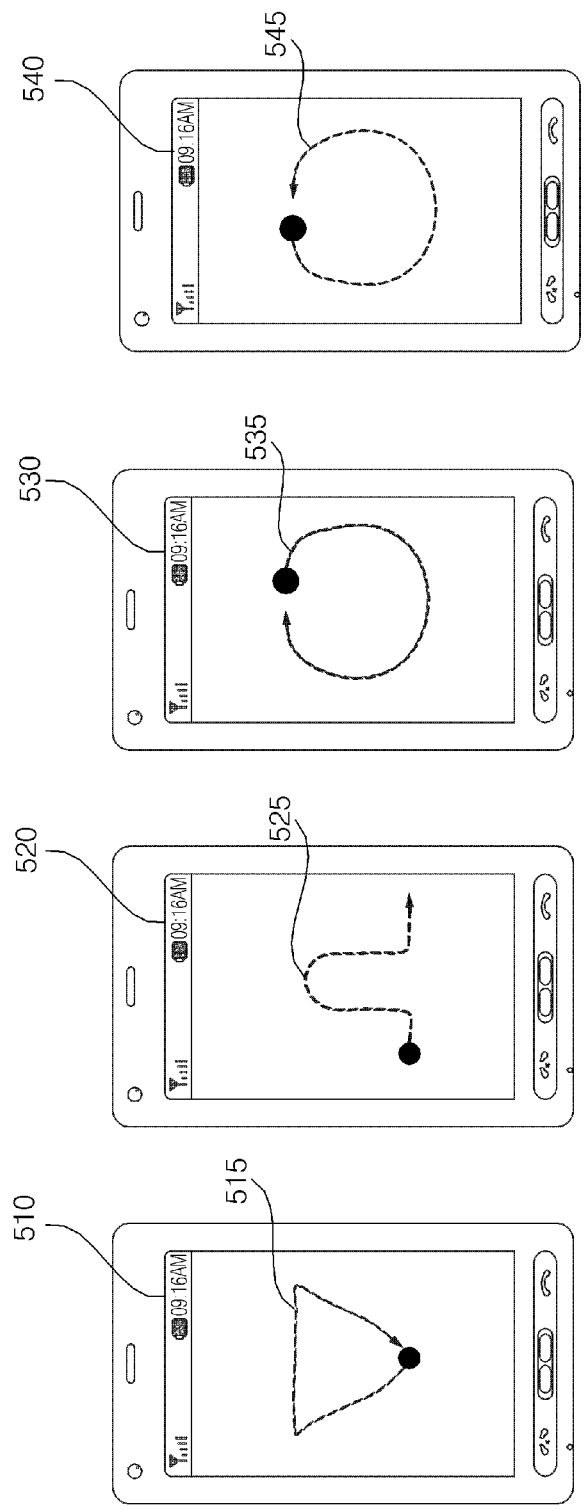
FIGS. 12(a), 12(b), 12(c), and 12(d) illustrate diagrams of screens for explaining the third exemplary embodiment.

FIGS. 12(a), 12(b), 12(c), and 12(d) illustrate diagrams of screens for explaining the third exemplary embodiment of the present invention. Referring to FIGS. 12(a) through 12(c), a plurality of gesture inputs 515, 525 and 535 representing different symbols or characters may be registered in the mobile terminal 100. Thereafter, if a gesture input representing the same symbol or character as any one of the gesture inputs 515, 525 and 535 is detected from the mobile terminal 100, the mobile terminal 100 may be released from lock mode.

However, even if the detected gesture input appears to represent the same symbol or character as the gesture inputs 515, 525 and 535, the mobile terminal 100 may not necessarily be able to be released from the lock mode in response to the detected gesture input. More specifically, referring to FIG. 12(d), when a gesture input 545, which appears to represent the symbol or character as the gesture input 535, is received, the mobile terminal 100 may not be able to be released from the lock mode because the gesture input 545 is different from the gesture input 535 in terms of stroke order.

Figures 13A, 13B, 13C:
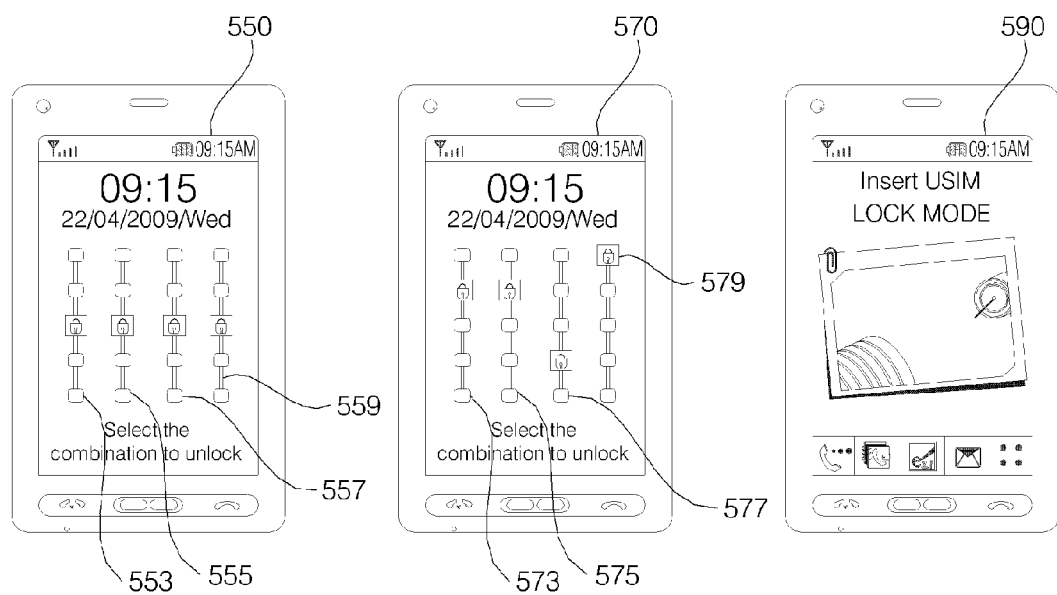
FIGS. 13(a), 13(b), and 13(c) illustrate diagrams of screens for explaining the fourth exemplary embodiment.

FIGS. 13(a), 13(b), and 13(c) illustrate diagrams of screens for explaining the fourth exemplary embodiment of the present invention. Referring to FIG. 13(a), when the mobile terminal 100 is placed in lock mode, a screen 550 including first through fourth slider bars 553, 555, 557 and 559 may be displayed on the display module 151. In this case, the mobile terminal 100 may be released from the lock mode and may then be placed in a predefined operating mode by appropriately dragging up or down the sliders in the first through fourth slider bars 553, 555, 557 and 559.

More specifically, when the sliders in the first through fourth slider bars 553, 555, 557 and 559 are appropriately dragged up or down and thus become the same as shown in FIG. 13(b), the mobile terminal 100 may be released from lock mode, as shown in FIG. 13(c), and may enter a predefined operating mode.

FIGS. 14(a), 14(b), 15, 16(a), 16(b), and 16(c) illustrate diagrams of screens for explaining the fifth exemplary embodiment of the present invention. Referring to FIGS. 14(a) and 14(b), if a first icon 605, which is an image of a dart, is dragged and thus overlaps a second icon 603, which is an image of a dartboard with a plurality of sections, when the mobile terminal 100 is placed in lock mode, the mobile terminal 100 may be released from the lock mode, and may enter a predefined operating mode corresponding to one of the dartboard sections currently being overlapped by the first icon 605. Alternatively, the atmosphere of an idle screen on the mobile terminal 100 may be changed, instead of releasing the mobile terminal 100 from the lock mode, according to the dartboard section currently being overlapped by the first icon 605.

Referring to FIG. 15, a first icon 637, which is an image of a person, and two or more second icons 631, 633 and 636, which are images of a toilet stool, may be provided. In this case, if the first icon 637 is dragged and thus overlaps the second icon 635, an operation corresponding to the second icon 635, for example, checking sent messages, may be performed.

Figures 16A, 16B, 16C:
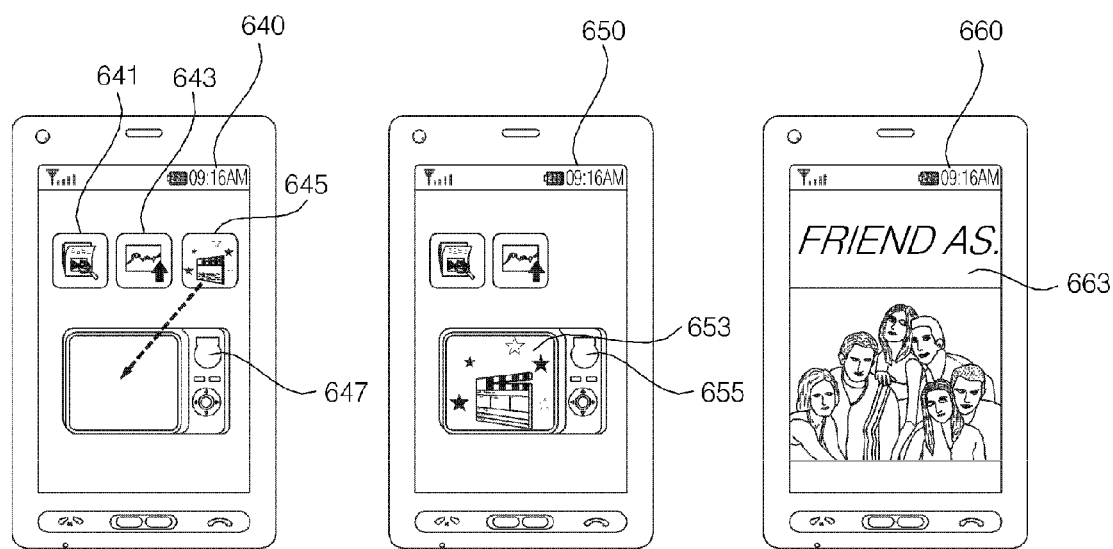

Referring to FIG. 16(a), two or more first icons 641, 643 and 645, which are a 'Maps' icon, a 'Stocks' icon, and a 'Videos' icon, respectively, and a second icon 647, which is a 'Camera' icon, may be provided. In this case, if the first icon 645 is dragged and thus overlaps the second icon 655, as shown in FIG. 16(b), a video screen 660 for playing a video file may be displayed.

The mobile terminal according to the present invention and the method of controlling the operation of the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to easily release a mobile terminal from lock mode and quickly enter a predefined operating mode simply by touching first and second regions on a display module. Therefore, it is possible to prevent the mobile terminal from being accidentally unlocked. In addition, it is possible to release the mobile terminal from the lock mode and control various operations performed by the mobile terminal by moving the mobile terminal in a predefined manner while touching the display module or by appropriately moving the sliders in slider bars displayed on the display module.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal comprising:
a touch screen;
a motion sensor; and
a controller configured to:
cause the touch screen to display a user interface for setting a predefined operating mode, the predefined operating mode set in response to an input received via the user interface, such that the mobile terminal enters the set predefined operating mode in response to a touch input received via the touch screen and a specific movement of the mobile terminal detected by the motion sensor while the mobile terminal is in a lock mode, the predefined operating mode comprising a camera mode;
cause the touch screen to display a lock screen when the mobile terminal is in the lock mode, wherein the mobile terminal remains in the lock mode when no movement of the mobile terminal is detected by the motion sensor while the touch input received via one or more arbitrary points of the touch screen displaying the lock screen is maintained;
unlock the mobile terminal that is in the lock mode and then enter the camera mode in response to detection of the specific movement of the mobile terminal by the motion sensor, the specific movement detected when the mobile terminal is rotated about an axis while the touch input received via one or more arbitrary points of the touch screen displaying the lock screen is maintained; and
cause the touch screen to display an operation screen associated with the camera mode instead of the lock screen when the mobile terminal is unlocked in response to the touch input and the specific movement that are received and detected concurrently.

2. The mobile terminal of claim 1, wherein the motion sensor comprises at least an acceleration sensor or a gyro sensor.

3. The mobile terminal of claim 1, wherein the receiving of the touch input and the detection of the specific movement of the mobile terminal occur sequentially such that the receiving of the touch input occurs prior to the detection of the specific movement, and the touch input is maintained on the touch screen while the specific movement is performed.

4. The mobile terminal of claim 1, wherein:
the mobile terminal does not respond to any typical touch or key input while the mobile terminal is in the lock mode; and
the mobile terminal does not respond to the touch input received while the mobile terminal is in the lock mode unless the specific movement of the mobile terminal is detected sequentially or substantially at the same time such that the specific movement is detected while the touch input is maintained on the touch screen.

5. The mobile terminal of claim 1, wherein the lock screen comprises at least a lock mode indicator, current time information, charge status information, or signal strength information.

6. The mobile terminal of claim 1, wherein the touch input is received via a specific location of the touch screen such that the mobile terminal stays in the lock mode when a touch input is received at a location of the touch screen other than the specific location, when no touch input is received at the specific location, and when a specific movement of the mobile terminal is detected while the touch input received at the location of the touch screen other than the specific location is maintained.

7. The mobile terminal of claim 1, wherein the predefined operating mode is pre-selected by a user via the user interface such that the predefined operating mode is changeable according to the user's selection of a function to be associated with the touch input and the specific movement of the mobile terminal.

8. A method of controlling a mobile terminal comprising a touch screen and a motion sensor, the method comprising:
displaying, on the touch screen, a user interface for setting a predefined operating mode, the predefined operating mode set in response to an input received via the user interface, such that the mobile terminal enters the set predefined operating mode in response to a touch input received via the touch screen and a specific movement of the mobile terminal detected by the motion sensor while the mobile terminal is in a lock mode, the predefined operating mode comprising a camera mode;
displaying a lock screen on the touch screen when the mobile terminal is in the lock mode, wherein the mobile terminal remains in the lock mode when no movement of the mobile terminal is detected by the motion sensor while the touch input received via one or more arbitrary points of the touch screen displaying the lock screen is maintained;

unlocking the mobile terminal that is in the lock mode and then entering the camera mode in response to detection of the specific movement of the mobile terminal by the motion sensor, the specific movement detected when the mobile terminal is rotated about an axis while the touch input received via one or more arbitrary points of the touch screen displaying the lock screen is maintained; and displaying an operation screen associated with the camera mode, instead of the lock screen, on the touch screen when the mobile terminal is unlocked in response to the touch input and the specific movement that are received and detected concurrently.

9. The method of claim 8, wherein the motion sensor comprises at least an acceleration sensor or a gyro sensor.

10. The method of claim 8, wherein the touch input is received and then the specific movement of the mobile terminal is detected sequentially such that the receiving of the touch input occurs prior to the detection of the specific movement, and the touch input is maintained on the touch screen while the specific movement is performed.

11. The method of claim 8, wherein:

the mobile terminal does not respond to any typical touch or key input while the mobile terminal is in the lock mode; and the mobile terminal does not respond to the touch input received while the mobile terminal is in the lock mode unless the specific movement of the mobile terminal is detected sequentially or substantially at the same time such that the specific movement is detected while the touch input is maintained on the touch screen.

12. The method of claim 8, wherein the lock screen comprises at least a lock mode indicator, current time information, charge status information, or signal strength information.

13. The method of claim 8, wherein the touch input is received via a specific location of the touch screen such that the mobile terminal stays in the lock mode when a touch input is received at a location of the touch screen other than the specific location, when no touch input is received at the specific location, and when a specific movement of the mobile terminal is detected while the touch input received at the location of the touch screen other than the specific location is maintained.

14. The method of claim 8, wherein the predefined operating mode is pre-selected by a user via the user interface such that the predefined operating mode is changeable according to the user's selection of a function to be associated with the touch input and the specific movement of the mobile terminal.

* * * * *